United States Patent [19]

Watkins

[11] Patent Number: 4,790,893
[45] Date of Patent: Dec. 13, 1988

[54] REPLICATION OF INFORMATION CARRIERS

[75] Inventor: John B. Watkins, Independence, Mo.

[73] Assignee: Hallmark Cards, Inc., Kansas City, Mo.

[21] Appl. No.: 887,902

[22] Filed: Jul. 18, 1986

Related U.S. Application Data

[63] Continuation-in-part of Ser. No. 632,477, Jul. 19, 1984, abandoned.

[51] Int. Cl.[4] .................. B29C 65/14; B29C 59/00
[52] U.S. Cl. ..................... 156/232; 156/233; 156/244.11; 156/244.21; 156/244.24; 264/22; 264/129; 264/145; 264/160; 264/220; 264/227; 264/284; 264/556; 264/1.3; 264/106
[58] Field of Search ............... 264/557, 556, 284, 1.3, 264/2.7, 1.6, 509, 212, 555, 220, 145, 226, 160, 106, 227; 425/72 R, 224, 385; 369/283, 284, 286, 288; 156/231, 232, 238, 150, 151, 240, 241, 275.5, 324, 244.16, 244.21, 244.24, 233, 5, 6

[56] References Cited

U.S. PATENT DOCUMENTS

| | | |
|---|---|---|
| 3,157,723 | 11/1964 | Hochberg . |
| 3,277,227 | 10/1966 | Kesseler et al. . |
| 3,423,274 | 1/1969 | Lahm et al. . |
| 3,459,839 | 8/1969 | Hutfles . |
| 3,635,614 | 1/1972 | Long et al. . |
| 3,709,647 | 1/1973 | Bainhart ............... 264/555 |
| 3,756,760 | 9/1973 | McBride . |
| 3,758,649 | 9/1973 | Frattaiola . |
| 3,853,447 | 12/1974 | Steinberg . |
| 4,017,575 | 4/1977 | Heyer . |
| 4,215,170 | 7/1980 | Oliva . |
| 4,327,467 | 5/1982 | Quaint . |
| 4,363,844 | 12/1982 | Lewis et al. . |
| 4,374,077 | 2/1983 | Kerfeld . |
| 4,430,363 | 2/1984 | Daniels et al. . |
| 4,478,769 | 10/1984 | Pricone et al. . |
| 4,486,363 | 12/1984 | Pricone et al. . |
| 4,519,065 | 5/1985 | Lewis et al. . |

FOREIGN PATENT DOCUMENTS

| | | |
|---|---|---|
| 0754984 | 3/1967 | Canada . |
| 47-46190 | 11/1972 | Japan . |
| 58-203019 | 11/1983 | Japan . |

Primary Examiner—Jan H. Silbaugh
Assistant Examiner—Hubert C. Lorin
Attorney, Agent, or Firm—Neuman, Williams, Anderson & Olson

[57] ABSTRACT

A process for producing an information carrier containing recorded audio and/or video information wherein a web of a thermoplastic material is extruded onto the patterned surface of a metal master and pressure is applied to force said thermoplastic material into contact with the metal master. The thermoplastic material is cooled to a temperature below its softening point to form an imaged thermoplastic web which is separated from the metal master. Then a thin film of metal particles is deposited on the imaged surface of the thermoplastic web and said metallized thermoplastic web is laminated with a substrate carrying an uncured coating of a radiation curable resin. The resin is cured and individual information carriers are separated from the web of information carrying laminate. A center hole is placed in the separated individual information carriers, when appropriate.

23 Claims, 2 Drawing Sheets

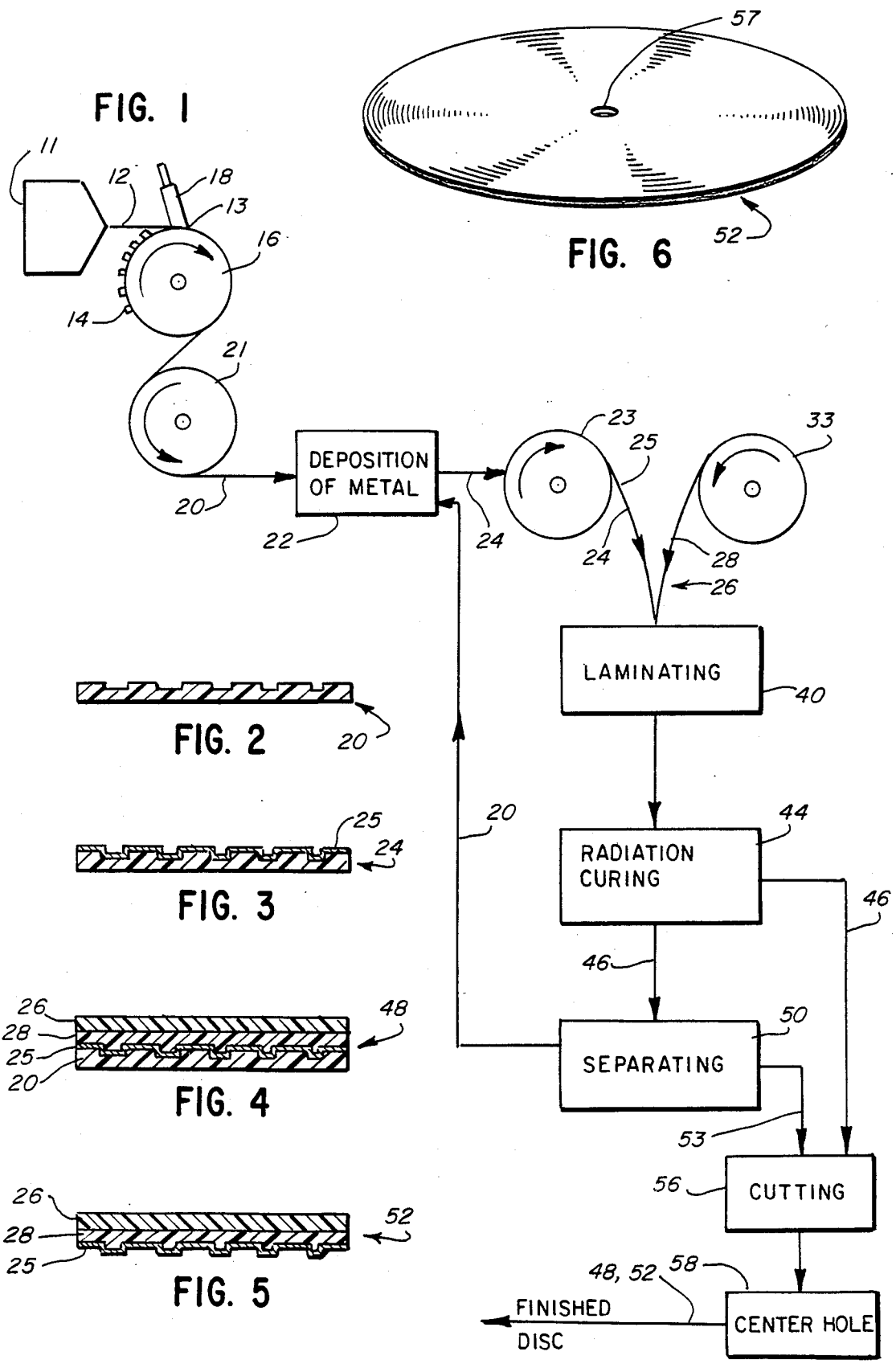

REPLICATION OF INFORMATION CARRIERS

This application is a continuation-in-part of copending application Ser. No. 632,477 filed July 19, 1984 now abandoned.

BACKGROUND OF THE INVENTION

This invention relates to the replication of information carriers and more particularly to a process for replicating information carriers such as compact discs carrying audio and/or video information.

Compact discs are widely used for storage of audio and/or video information recorded as depressions or pits at a high density. The usual size of the standard compact discs is 4.75 inches and a single disc may carry billions of pits representing recorded information. The information recorded on the discs can be obtained from the disc by appropriate scanning techniques such as optical recovery by means of laser beams. The compact discs carrying recorded information are usually made by forming a photoresist layer on a surface of a disc of glass which has a high degree of flatness. The photoresist layer is then irradiated with a laser beam or electron beam modulated in intensity by information signals to be recorded. The photoresist layer is then developed to form depressions or pits corresponding to the information signals. A thin film of silver is deposited by chemical plating on the surface of the photoresist layer in a step known as silver mirror treatment to render the photoresist layer surface electrically conductive. Thereafter a layer of nickel is deposited on the silver film by electroplating and upon separation of the nickel film it carries the image corresponding to the recorded information and serves as a master.

At the present time, compact discs are produced by injection molding with individual discs being formed in a mold cavity. To produce compact discs by the conventional injection molding procedure, a nickel master is placed into a mold cavity and is copied by injecting a moldable plastic into the mold cavity. When the injected plastic resin is frozen, usually in a period on the order of 10 seconds, the molded plastic carrying the image of the nickel master is removed from the mold. The next step in production involves metallizing the molded plastic with aluminum using known techniques. The aluminum is then coated with a protective lacquer or varnish and finally, the compact disc is provided with a hole which is aligned in the center of the data image lines.

In producing compact discs by conventional injection molding it is very important that the injection molding of the plastic and the metallization step be conducted in a clean environment to prevent dust particles from contaminating the image surface before the metal is added. The pit tracks on the disc are of very minute dimensions with the distance between pit tracks being only about 1.6 microns. If the tracks become clogged or covered, reproduction of the recorded information is seriously affected. The number of compact discs which can be produced by conventional injection molding in a given time is relatively low since the injected plastic must be permitted to freeze before it can be removed from the mold cavity. Furthermore, with the conventional production technique the substrate of the disc is limited to a molded plastic and an injection molding grade of plastic is required.

SUMMARY OF THE INVENTION

It is therefore a prinicpal object of this invention to provide a new and advantageous method for production of information carrying compact discs.

It is a further object of the invention to provide a process for producing at high speeds a multiplicity of information carrying compact discs.

It is a still further object of the invention to provide methods for producing information carrying compact discs having a variety of substrates.

The process of this invention for producing an information carrier containing recorded audio and/or video information comprises:

(a) extruding in the form of a web a thermoplastic material at a temperature above its softening point onto the patterned surface of a metal master, the patterned surface of said metal master containing depressions corresponding to digitally encoded audio and/or video information;

(b) applying pressure to force said thermoplastic material into contact with the patterned surface of the metal master;

(c) cooling the thermoplastic material to a temperature below its softening point to form an imaged thermoplastic web carrying a replication of the patterned surface from the metal master;

(d) separating from the metal master the imaged thermoplastic web;

(e) depositing a thin film of metal particles on the imaged surface of said imaged thermoplastic web to provide for a metallized imaged surface on said imaged thermoplastic web;

(f) laminating a substrate carrying an uncured coating of a radiation curable resin onto said metallized imaged surface of said imaged thermoplastic web to form a web of information carrying laminate;

(g) radiating the laminate to cure the resin substantially instantaneously;

(h) removing an individual information carrier from the web of information carrying laminate; and (i) (optionally) placing a center hole in the separated individual information carrier, when appropriate.

In an alternative embodiment, after the resin is cured (step g) the imaged thermoplastic web is separated from the cured laminate to provide in the form of a web an information carrying laminate formed of the substrate, cured resin and film of metal particles. Thereafter, an individual information carrier is removed from the web and a center hole placed therein, when appropriate.

BRIEF DESCRIPTION OF THE DRAWINGS

FIG. 1 is a schematic flow diagram of the process for producing information carrying compact discs according to this invention.

FIGS. 2 through 5 are fragmentary cross-sectional views of progressive steps in the production of the compact discs according to the invention.

FIG. 6 is a perspective view of a compact disc produced in accordance with the invention.

DESCRIPTION OF PREFERRED EMBODIMENT OF THE INVENTION

Figure 7:
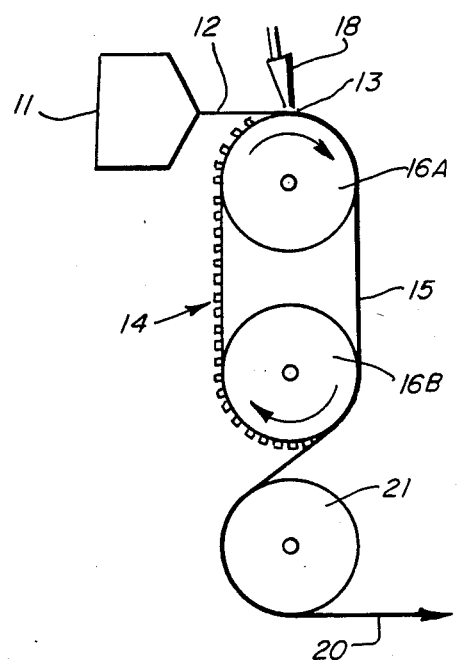
FIG. 7 is another embodiment of apparatus for carrying the metal master onto which a thermoplastic material is extruded in accordance with the invention.

Referring to FIG. 1, a thermoplastic material 12 is extruded in the form of a continuous web at a temperature above its softening point from an extrusion die 11. A large variety of thermoplastic materials which are rendered soft and moldable by heat can be used. Representative of suitable materials are polypropylenes, polyethylenes, polycarbonates, polyvinylchlorides, polyesters, polystyrenes, acrylics and the like. Preferred thermoplastic materials are those that soften and become moldable at temperatures slightly above room temperature. For certain applications, it is preferred that the plastic be transparent, or at least translucent, for viewing the image through the plastic. Preferred illustrative thermoplastics include polypropylenes and polyesters.

The extruder 11 can be a conventional extruding die for extruding plastic material. The softened thermoplastic 12 is extruded from extruder 11 onto an imaged master 14 containing patterned or imaged surface depressions or pits corresponding to audio or video recorded digital information which can be retrieved by known techniques, such as, for example, laser scanning. The master 14 is formed of a metal such as nickel and can be secured to a working tool which in FIG. 1 is shown as a rotating cylinder 16. Alternatively, as illustrated in FIG. 7, the master 14 can take the form of a continuous belt 15 which is suspended on and between two parallel rotating cylinders 16A and 16B, which form the working tool. Preferably, depending upon the nature of the image to be reproduced and the intended use of the replicates, the thermoplastic material is extruded onto the imaged master at a rate to provide, when cooled, a film of plastic having a thickness of from 0.1 to 20 mils, and most preferably about 0.5 to 1.5 mils.

The dimensions of the working tool can vary so as to accommodate a desired number of images to be duplicated. For example, the rotating cylinder 16 can have a longitudinal dimension or face width of from about 6 to 60 inches and a circumference of 18 inches so as to accommodate from 1 to 12 images across the tool and 4 circumferentially disposed images. A working tool of such dimensions would produce from 4 to 48 copies of the master upon each revolution.

The image to be duplicated can be formed on the metal master 14 by any suitable known techniques, such as, vacuum deposition, sputtering, chemical deposition and the like. The metal master 14 is formed of a material which retains its integrity under temperatures high enough to soften or melt the plastic used in the process, is hard enough to retain the image after multiple uses, conducts heat sufficiently to help cool the melted plastic, and which preferably can be formed into shapes as illustrated in FIGS. 1 and 7. A material which satisfies these criteria particularly well, particularly for placement on a rotatable cylinder or moving belt, is nickel. Other suitable materials include copper, silicones and epoxies. For flexibility and ease of attachment, the metal image master 14 is usually in the range of 1 to 8 mils in thickness. It is attached to the working tool, i.e rotatable cylinder 16, or to belt 15 by either mechanical methods or adhesives. The working tool is then positioned so that it rotates in close proximity to an extrusion sheet die 11 of the same working width. The sheet die is fed with a thermoplastic resin mixture under pressure such that the plastic film 12 extrudes onto the imaged surface of the metalcovered working tool in the form of a continuous web. Typically, the extruded plastic is a polypropylene or polyester resin which extrudes in the temperature range of 370° to 470° F. with a sheet die pressure of 900 to 1800 psi. The plastic film thickness should be in the range of 1 to 5 mils. However, this process is flexible and will copy images very well above and below this range.

The cylinder 16 carrying the metal master 14 on its exterior surface rotates as the softened plastic 12 is extruded thereon. The rotating cylinder 16 is preferably of the known water-cooled type in which water is passed through the interior thereof. The cylinder is cooled in this manner to a temperature below the softening temperature (freezing temperature) of the extruded plastic. As the cylinder rotates, pressure is applied to the thermoplastic material causing it to conform to the surface of the imaged metal master 14, with the image thereon being faithfully transferred to the thermoplastic material in its frozen state.

According to one preferred embodiment of the invention fluid pressure is applied from any suitable device 18 capable of directing a stream of gas onto the film of thermoplastic material which is spread on the imaged metal master 14. The extruded thermoplastic film 12, from the sheet die 11, passes below a stream of gas such as an air knife 18 at the same time that it comes in contact with the imaged metal master 14 attached to the cylinder 16. The frictionless air pressure curtain presses the film onto the imaged metal master and irons out the air which could otherwise be trapped between the imaged metal master and the thermoplastic film. The surface speed of the cylinder is usually in the range of 40 feet per minute. Typically, although variable the air knife is held above the cylinder a distance of 20 mils and operated with an internal air pressure of 20 to 40 psi and the slit opening of the air knife is set at 10 mils prior to pressurization. This gas stream or gas curtain should be such as to prevent air from being trapped between the imaged metal master and the thermoplastic film to which the image is to be transferred. Thus, the gas stream performs an "ironing" effect and preferably is directed over the entire width of the thermoplastic film at temperatures below the freezing temperature of the plastic material. The gas is directed onto the thermoplastic material with sufficient force to "iron" it against the imaged metal master and to force it into intimate contact therewith, the minimum amount of such pressure being a function of the viscosity of the plastic material and the thickness of the plastic film. Ordinarily, such pressures fall in a range between approximately 0.1 and 10 grams per centimeter.

The preferred fluid pressure device 18 can be any suitable device which is capable of forming a gas curtain over the surface of the thermoplastic passing therebelow. Examples of suitable devices are air knives, and air pressure zones created through the use of porous materials through which air or other gas is directed. Thus, referring to FIGS. 1 and 7, air or other gas 13 is expelled through the narrow aperture of an air knife 18 onto the softened thermoplastic web 12, at substantially the same time and location as the softened thermoplastic web 12 contacts the imaged metal master 14. It is particularly preferred to transfer the image from the metal master 14 by using fluid pressure, however, mechanical pressure means such as described in U.S. Pat. No. 3,756,760 can also be employed. The air (or other confined or unconfined gas or liquid) which is directed onto the thermoplastic film, as the image is being transferred to the softened plastic, exerts an "ironing" effect on the plastic so as to exclude air bubbles between the plastic film and image master. This results in superior quality replicates and is particularly advantageous when the image to be reproduced involves very fine details, such as is the case with digital information recorded on compact discs. The gas curtain exerts only substantially normal (perpendicular) forces on the film surface which does not cause lateral movement from which smearing of the image could occur. Moreover, the gas curtain adjusts to gauge variations in the thickness of the plastic film, thus insuring good contact of the plastic with the image master. This adjustment is superior even to that provided by a flexible nip roll such as the one described in U.S. Pat. No. 3,756,760. Also, because the gas curtain or other comparable fluid pressure means is "forgiving" and not rigid, when the mass of the softened plastic begins to shrink as it cools, the web can pull away from the image master, rather than being dragged laterally along the image master by the force of the shrinkage, thus avoiding damage to the replicated image which became fixed (frozen) almost instantaneously upon contact with the image master. This free shrinkage also keeps the plastic film from becoming stressed or "oriented", as generally happens with opposing nip rolls, which often results in warpage of the resulting web if the ambient temperature changes, particularly if the web is thin.

The heat transfer qualities of the gas curtain or other fluid pressure means allow greater line speeds while adequately cooling the imaged plastic film. The gas curtain directed onto the rotating cylinder at a substantially perpendicular orientation produces very little friction, thus permitting very thin gauge imaged film to be produced without a likelihood of web wrinkling or breakage. With a thin gauge plastic film, the image can be viewed satisfactorily from the non-image side of the web without the necessity of polishing that side. This property is desired because some product applications require viewing the image from the back side of the imaged plastic film. Thin gauge films also afford greater economy since more imaged film can be produced from a given amount of plastic and more square feet of imaged film can be accommodated on each production roll.

The use of a gas curtain or other equivalent fluid pressure means rather than opposing mechanical pressure nip rolls greatly reduces the pressure applied to the plastic film, and many plastic films are lubricants in their liquid states. For both of these reasons, the pressure applied to the imaged tool is negligible, resulting in a negligible amount of deformation or wear of the imaged tool. Thus, unless the plastic and the imaged tool are made of chemically reactant materials, the imaged tool has a long, useful life.

The gas curtain or other fluid pressure means can be applied to rotating cylinders with circumferential diameter variations, without shear stress, which results from differential surface velocities inherent in the use of opposing nip rolls with circumferential diameter variations, being applied to the imaged plastic web. Such shear stress can distort or smear the replicated image. On the contrary, the application of fluid pressure according to this invention enables the production of imaged film with configurations other than planar.

In lieu of a gas-directing device as exemplified in FIGS. 1 and 7, there can be used any device which functions to exert fluid pressure on the surface of the thermoplastic film when it comes into contact with the imaged tool. The fluid pressure must be sufficient to "iron" the plastic against the imaged tool and to force the thermoplastic film into intimate contact therewith. Free-flowing or flexibly confined fluid pressure can be utilized. Thus, for example, the fluid pressure can be exerted by free-flowing gas or liquid which is not confined in a container or by gas or liquid confined in a resilient container such as, for example, an elastomeric bag. Preferably, the gas or liquid within the resilient container is at a relatively low temperature below the softening temperature of the thermoplastic material so that heat is conducted from the thermoplastic film causing it to become frozen. Cooling of the confined gas or liquid can be accomplished by any suitable means. While the use of such a container to confine a gas or liquid creates a certain limited amount of friction between the container and the thermoplastic film, such friction can be useful, for example, to polish one side of the thermoplastic film.

The plastic web then continues around the imaged metal master 14 attached to the cylinder 16 for approximately 180 degrees and is reverse wrapped onto a second cylinder or roll 21 which conducts residual heat away from the web and from which the imaged thermoplastic web can be unwound for further processing in accordance with this invention. The imaged thermoplastic web can be stored on roll 21 for any desired length of time and thus further processing to form the information carrier medium need not be accomplished contemporaneously with the formation of the imaged thermoplastic web. Moreover, by winding the imaged thermoplastic web on roll 21, contamination thereof by dust or other contaminants is inherently greatly minimized since the imaged surfaces are not exposed to the environment as is the case with the separate images produced by the conventional injection molding procedure for producing compact discs. An enlarged cross-sectional view of the imaged thermoplastic web at this stage of production, designated by the numeral 20, is shown FIG. 2.

To produce a multiplicity of information carriers, the image carrying thermoplastic web 20 is unwound from roll 21 and undergoes the step of metallic deposition at step 22. Briefly, at step 22 an extremely thin coat 25 of a metal such as aluminum is deposited upon the web 20 so as to conform to the imaged surface on the web. The resultant metallic film on the web 20 preferably has a thickness of approximately 100 to 1000Å and this extremely small thickness permits minimal use of metallic materials with the metal conforming exactly to the contours of the patterned imaged web.

The thermoplastic web 20 is metallized by any known technique such as vacuum metallization, sputtering, chemical deposition or any other coating process. A well known and commonly used process suitable for use herein is vacuum metallization, wherein vaporized metal is condensed onto the substrate to be metallized. This procedure takes place in a vacuum on the order $10^{-4}$ Torr. At these low pressures the molecules of metallic vapor issuing from the evaporation source can reach the web without being blocked or oxidized by gases. After metallization. the metallized web 24 can be wound on a roll 23 for further processing immediately or at a later time. Suitable metals for deposition include aluminum, copper, silver, nickel, thin gold, their alloys and other vaporizable metals. The metal deposited will have a thickness of generally less than about 1000 Å, typically less than about 550 Å, and preferably less than about 200 Å.

The next step in the process according to this invention involves laminating the metallized plastic web 24 with a substrate 26 carrying a resin or varnish 28 which is curable by exposure to radiation, such as ultraviolet radiation or electron beam radiation. To this end, as illustrated in FIG. 1, the selected substrate 26 coated with radiation curable varnish 28 is unwound from a roll 33 and before the varnish 28 is cured, laminated at 40 with the metallized thermoplastic web 24. The substrate 26 can include transparent plastics, glass, metal, ceramic and paper materials. The substrate 26 generally has a thickness of from about 0.002 to 1.0 inch and with flexible substrates preferably a thickness of about 0.100 in order to achieve an optically flat surface for playback. With the use of a transparent substrate, the image which is to be subsequently transferred thereto is read through the substrate by a laser scanner in conventional manner. However, with the process of this invention the substrate 26 need not be transparent or clear and opaque substrates such as metal, ceramics, paper, etc. can be used. With a compact disc formed of an opaque substrate, the image is read from the other (metallized) side by a laser scanner. Playback or reading of the image is possible from either side since the laser scanner can detect either a depression or a raised surface.

For lamination, the webs 24 and 26 are brought together at 40 in face-to-face relationship between a pair of rollers and pressure is applied to effect lamination. The pressure required and the types of rollers for lamination can be routinely determined. For example, the teachings in U.S. Pat. No. 4,215,170 with respect to the lamination can be followed. Representative varnishes which are curable by radiation include acrylated epoxies, acrylated urethanes, acrylics, polyesters, thiolene and the like. The optimum amount of the radiation curable varnish that should be applied is readily determined by those skilled in this art. This amount varies depending upon the viscosity of the varnish, the degree to which the varnish is reduced with solvents, the pressure used during the lamination step, the hardness of the pressure rolls, and the porosity and surface irregularities of the substrate.

After lamination at 40, the laminate is then subjected to curing by suitable radiation techniques known in the art. One particular preferred procedure for curing the resin substantially instantaneously is by use of an electron beam as described pending U.S. application Ser. No. 509,095 filed by Paul Heinzer et al. on June 28, 1983. More particularly, the electron beam curing apparatus used in the said application, shown in block diagram form at 44, can be of the type manufactured by Energy Sciences, Inc., 8 Gill St., Woburn, Mass. 01801. This apparatus operates on the principle that when accelerated electrons penetrate into material they lose speed and transfer their energy into the material to be treated. The transferred energy excites molecules and forms a cloud of secondary electrons and free radicals which initiate chemical chain reactions in specific materials. There are two major applications of electron beam treatment, the simplest involves cross-linking and vulcanization, i.e., bonding between adjacent polymer chains and the second involves electron initiated free radical polymerization.

The electron beam curing apparatus consists of several main elements. The source of the electrons is a heated filament, the cathode. From here the electrons are accelerated, in vacuum, towards an electron transmissable window, which represents a grounded anode. A high voltage potential applied between the cathode and the anode accelerates the emitted electrons close to the speed of light. The window, a thin metal foil, separates vacuum in the accelerator from atmospheric pressure in the treatment zone. The acceleration is done in an evacuated environment to avoid collisions with gas molecules and to prevent cathode oxidation.

There are two different types of industrial electron accelerators. An earlier design utilizes a pencil-shaped beam of electrons from a point source which is accelerated through a multistage accelerator tube and then scanned by an electromagnetic field through the window over the width of the product to be treated. This type of equipment is normally used for applications above 300 kV. Later designs, based on a linear cathode, generate a curtain of electrons over the entire product width without the need of scanning the beam. The electron beam curing apparatus discussed above is described in a 1979 publication of Energy Sciences Incorporated entitled "ELECTRO CURTAIN".

With the electron beam curing process described above, the varnish coating is cured by exposure for a few milliseconds to the curtain of electrons without the use of heat. Since the product is completely, and essentially instantaneously, cured, it is immediately available for further processing.

A slight heat build-up due to the energy transfer of the electrons and the chemical action can be observed. Normally, the heat build-up will not exceed a few degrees depending on the curing dose and the thickness of the reactive layer. Thus, the equipment for electron beam curing can be described as a "cold oven" in which the reaction is initiated by the creation of free radicals by high energy electrons rather than by thermal effects.

The particular dose or treatment level required to cure a particular product depends on the type of material being cured and the thickness of the material. Typically, a dose of between 1 and 6 magarads will be used, depending on the material and thickness of the varnish, as well as the substrate and the thermoplastic web. Typically also, the voltage of the beam using the equipment described depends on the thickness of the substrate that the beam is required to penetrate. Therefore, it is preferable to cure through the thermoplastic web, since it is thin and consistent, rather than through the substrate, which may be coarse and inconsistent in thickness.

The laminate resulting from the radiation curing step, designated with the numeral 46, is then delaminated at 50 so that the thermoplastic web 20 is separated therefrom to produce in the form of a web an information carrying laminate 53 comprising the substrate 26, the radiation cured resin 28 and the metal layer 25. The imaged plastic web 20 separated at 50 can be recycled to the metallization step 22.

A protective coating can then be applied to one or both sides of the web 53. Illustrative protective coating materials are nitrocellulose lacquers, acrylic lacquers, vinyl lacquers, radiation-curable clear top coats and the like. It is desirable to employ a clear or transparent protective coating material, such as, for example, an acrylic lacquer or a vinyl copolymer lacquer, particularly when the substrate 26 is an opaque material so as to facilitate laser read-out.

Thereafter, the web 53 can be subjected to a cutting operation at 56 to separate individual information carrying compact discs 52 from the web. A center hole 57 is then punched at 58 in the individual discs with the center hole providing for proper positioning of the disc for read-out or retrieval of the recorded information.

Alternatively, the delamination step at 50 can be omitted and the information carrying web 46 can be sent directly to the cutting operation at 56 to separate individual compact discs 48 (FIG. 4) comprising the substrate 26, the radiation cured resin 28, metal layer 25 and plastic web 20. The discs 48 are provided with a center hole at 58 and can be provided on one or both sides with a protective coating as indicated above.

The process of the present invention for producing multiple copies of information carriers affords numerous advantages. Thus, by the process of the invention information carriers, such as compact discs, can be produced at high speeds, with production rates some 10 to 20 times faster than the rate achieved by producing such discs by the conventional injection molding technique. Furthermore, the process permits the use of a variety of substrate materials, both transparent and opaque, and is not limited to use of only an injection grade of moldable plastic. Also, discs of very thin gauge can be produced since substrates other than flexible plastic materials can be utilized. The problems of dust contamination during the production of the discs is greatly minimized, resulting in higher quality discs which provide excellent optical read-out.

The present invention has been described in detail with reference to replicating information carriers in the form of compact discs. However, the invention is admirably applicable to the replication of other forms of information carriers such as holograms, diffraction grating patterns, audio discs, and video discs having high density information recorded in the submicron range.

Those modifications and equivalents which fall within the spirit of the invention are to be considered a part thereof.

What is claimed is:

1. A process for replicating an information carrier containing stored digitally encoded information which comprises:
   (a) extruding in the form of a web a thermoplastic material at a temperature above its softening point onto a patterned surface of a master, the patterned surface of said master having vertically displaced areas corresponding to digitally encoded information;
   (b) applying pressure to force said thermoplastic material into contact with the patterned surface of the master;
   (c) cooling the thermoplastic material to a temperature below its softening point to form an imaged thermoplastic web carrying a replication of the patterned surface from the master;
   (d) separating from the master the imaged thermoplastic web;
   (e) depositing a thin film of metal particles on the imaged surface of said imaged thermoplastic web to provide for a metallized imaged surface on said imaged thermoplastic web;
   (f) laminating a substrate carrying an uncured coating of a radiation curable resin onto said metallized imaged surface of said imaged theromoplastic web to form a web of information carrying laminate;
   (g) radiation said laminate to cure the resin substantially instantaneously; and
   (h) removing an individual information carrier from said web of information carrying laminate.

2. A process in accordance with claim 1 wherein after radiating the imaged thermoplastic web is separated from the cured laminate to provide in a form of a web an information carrying laminate formed of the substrate, cured resin and metal layer.

3. A process in accordance with claim 1 wherein after radiating a protective coating is applied to one or both sides of said information carrying laminate.

4. A process in accordance with claim 2 wherein after radiating a protective coating is applied to one or both sides of said information carrying laminate.

5. A process in accordance with claim 1 wherein said individual information carrier is in a form of a compact disc.

6. A process in accordance with claim 1 wherein said master is carried by a moving working tool whereby the thermoplastic material is extruded onto said master as it moves with the working tool.

7. A process in accordance with claim 1 wherein a multiplicity of masters are carried by a moving working tool whereby the thermoplastic material is extruded onto the patterned surface of each of said masters and thereby forming a web carrying a multiplicity of information carriers.

8. A process in accordance with claim 1 wherein said substrate is a transparent material.

9. A process in accordance with claim 1 wherein said substrate is an opaque material.

10. A process in accordance with claim 1 wherein said substrate is a plastic material.

11. A process in accordance with claim 1 wherein said substrate is a metal.

12. A process in accordance with claim 1 wherein said substrate is ceramic.

13. A process in accordance with claim 1 wherein said substrate is paper.

14. A process in accordance with claim 1 wherein said substrate has a thickness of about 0.002 to 1.0 inch.

15. A process in accordance with claim 1 wherein said substrate has a thickness of about 0.100 inch.

16. A process in accordance with claim 1 wherein said radiation curable resin is one which is curable by electron beam radiation.

17. A process in accordance with claim 1 wherein said radiation curable resin is one which is curable by ultraviolet radiation.

18. A process in acccordance with claim 1 wherein said metal particles consist of aluminum.

19. A process in accordance with claim 1 wherein said metal particles are deposited by vacuum metallization.

20. A process in accordance with claim 1 wherein step (b) is performed by applying fluid pressure to force aid thermoplastic material into contact with said patterned surface of said master.

21. A process in accordance with claim 20 wherein an air gun is employed to apply the fluid pressure.

22. A process in accordance with claim 1 wherein a said master is a metal master.

23. A process in accordance with claim 2 wherein said individual information carrier is in a form of a compact disc.

* * * * *

UNITED STATES PATENT AND TRADEMARK OFFICE
CERTIFICATE OF CORRECTION

PATENT NO. : 4,790,893

DATED : December 13, 1988

INVENTOR(S) : JOHN BRUCE WATKINS

It is certified that error appears in the above-identified patent and that said Letters Patent is hereby corrected as shown below:

Column 6, line 54, after "order" insert -- of --

Column 9, line 60, "radiation" should be -- radiating --

Column 10, line 54, "aid" should be -- said --

Signed and Sealed this

Twenty-third Day of May, 1989

Attest:

DONALD J. QUIGG

Attesting Officer

Commissioner of Patents and Trademarks